(12) United States Patent
Van Dyke et al.

(10) Patent No.: US 7,286,134 B1
(45) Date of Patent: Oct. 23, 2007

(54) SYSTEM AND METHOD FOR PACKING DATA IN A TILED GRAPHICS MEMORY

(75) Inventors: James M. Van Dyke, Austin, TX (US); John S. Montrym, Cupertino, CA (US); Steven E. Molnar, Chapel Hill, NC (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 10/740,229

(22) Filed: Dec. 17, 2003

(51) Int. Cl.
*G06F 12/02* (2006.01)
*G06T 9/00* (2006.01)
*G06T 15/40* (2006.01)

(52) U.S. Cl. .................. 345/544; 345/555; 345/421

(58) Field of Classification Search ............... 345/544, 345/531, 543, 540, 530, 536, 422, 421, 426, 345/555
See application file for complete search history.

(56) References Cited

U.S. PATENT DOCUMENTS

| | | | |
|---|---|---|---|
| 5,109,520 A | 4/1992 | Knierim | |
| 5,394,170 A * | 2/1995 | Akeley et al. | 345/556 |
| 5,408,606 A | 4/1995 | Eckart | |
| 5,452,299 A | 9/1995 | Thessin et al. | |
| 5,485,586 A | 1/1996 | Brash et al. | |
| 5,500,939 A | 3/1996 | Kurihara | |
| 5,572,655 A | 11/1996 | Tuljapurkar et al. | |
| 5,623,688 A | 4/1997 | Ikeda et al. | |
| 5,625,778 A | 4/1997 | Childers et al. | |
| 5,664,162 A | 9/1997 | Dye | |
| 5,696,945 A * | 12/1997 | Seiler et al. | 345/540 |
| 5,781,201 A * | 7/1998 | McCormack et al. | 345/544 |
| 5,898,895 A | 4/1999 | Williams | |
| 5,905,877 A | 5/1999 | Guthrie et al. | |
| 5,923,826 A | 7/1999 | Grzenda et al. | |
| 6,104,417 A | 8/2000 | Nielsen et al. | |
| 6,115,323 A | 9/2000 | Hashimoto | |
| 6,157,963 A | 12/2000 | Courtright et al. | |
| 6,157,989 A | 12/2000 | Collins et al. | |
| 6,172,670 B1 * | 1/2001 | Oka et al. | 711/200 |
| 6,202,101 B1 | 3/2001 | Chin et al. | |
| 6,205,504 B1 | 3/2001 | Ng | |
| 6,219,725 B1 | 4/2001 | Diehl et al. | |
| 6,384,822 B1 * | 5/2002 | Bilodeau et al. | 345/422 |
| 6,469,703 B1 | 10/2002 | Aleksic et al. | |
| 6,545,684 B1 | 4/2003 | Dragony et al. | |
| 6,570,571 B1 | 5/2003 | Morozumi | |
| 6,580,427 B1 * | 6/2003 | Orenstein et al. | 345/422 |
| 6,674,430 B1 * | 1/2004 | Kaufman et al. | 345/419 |
| 6,853,382 B1 | 2/2005 | Van Dyke et al. | |
| 7,129,941 B2 * | 10/2006 | Deering et al. | 345/422 |
| 2003/0067467 A1 * | 4/2003 | Wilt et al. | 345/473 |
| 2003/0095127 A1 * | 5/2003 | Blais | 345/555 |
| 2004/0189652 A1 * | 9/2004 | Emberling | 345/557 |

* cited by examiner

*Primary Examiner*—Kee M. Tung
*Assistant Examiner*—Joni Hsu
(74) *Attorney, Agent, or Firm*—Cooley Godward Kronish LLP (57) ABSTRACT

A tiled graphics memory permits z data and stencil data to be stored in different portions of a tile. The tile may be further divided into data sections, each of which may have a byte size corresponding to a memory access size.

21 Claims, 7 Drawing Sheets

SYSTEM AND METHOD FOR PACKING DATA IN A TILED GRAPHICS MEMORY

FIELD OF THE INVENTION

The present invention is generally directed towards packing data in a tiled graphics memory. More particularly, the present invention is directed towards packing z data and stencil data in a tiled graphics memory.

BACKGROUND OF THE INVENTION

Graphics systems sometimes employ tiling to store pixel data in a graphics memory. Tiling is a memory addressing mode in which a square or rectangular pixel area is mapped into consecutive addresses to improve memory access coherence. The number of pixels associated with an individual tile may vary depending upon the design of the graphics system. A tile commonly includes different types of graphical data. In some graphics processing units (GPUs), tiles are used to store combined z data (also known as depth data) and stencil data (also known as "s" data).

A drawback of conventional tiling techniques is that the reading, writing, clearing, and compression of tile data is not as efficient as desired. In some graphics systems, such as graphics systems with 24 bit z data, z data may not pack efficiently into tiles.

Figure 1:
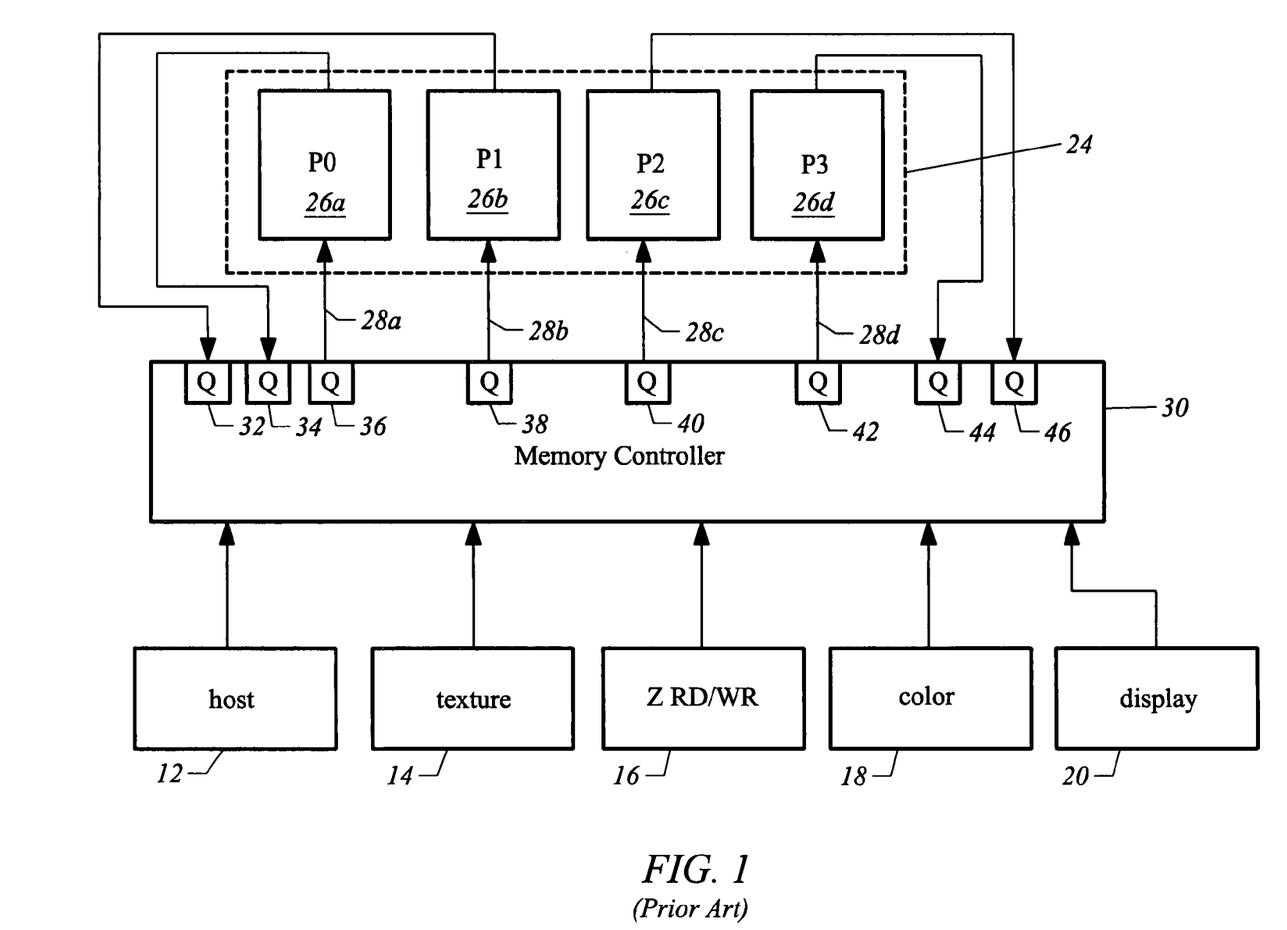
FIG. 1 is a block diagram of a prior art partitioned memory system.

Graphics systems increasingly use partitioned graphics memories to provide a larger effective memory bandwidth and memory size than possible with a single memory chip having a single bus. Additionally, a partitioned memory can provide more efficient use of memory bandwidth. In a partitioned graphics memory, several memory chips are coupled to a memory controller. FIG. 1 illustrates a partitioned memory described in more detail in U.S. patent application Ser. No. 09/687,453, entitled "Controller For A Memory System Having Multiple Partitions," commonly assigned to the assignee of the present invention, the contents of which are hereby incorporated by reference. In the partitioned graphics memory of FIG. 1, the physical memory is a memory array 24 comprising two or more operable partitions 26a, 26b, 26c, and 26d. Each memory partition has its own individual bus 28a, 28b, 28c, and 28d connecting it to a memory controller 30. The memory controller 30 includes queues 32, 34, 36, 38, 40, 42, 44, and 46 and control logic (not shown) to determine routing to the partitions such that the partitioned memory appears as a non-partitioned memory to clients, such as host 12, texture 14, z read/write module 16, color module 18, or display 20.

Tile data may be stored in a partitioned memory system. As with other graphics memories, the efficient use of tile data is of concern in partitioned memory systems.

Therefore, what is desired is an improved system, data format, and method for utilizing tiles in a graphics memory, including partitioned and non-partitioned graphics memories.

SUMMARY OF THE INVENTION

A tiled graphics memory permits z data and stencil data to be stored in different portions of a tile. This permits z data to be accessed independently of stencil data.

In one embodiment of a tile, the tile comprises an array of data sections, with each data section having a byte size corresponding to a memory access size. The z data is packed into a first portion comprising at least one data section and the stencil data is packed into a second portion comprising at least one data section.

In one embodiment of a tiled graphics memory, a memory controller is configured to organize z data and stencil data for groups of pixels into tiles. The memory controller has a mode in which stencil data for a group of pixels is packed into a first portion of the tile and z data for the group of pixels is packed into a second portion of the tile.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The present invention includes an apparatus, system, method, and data structure for utilizing tiles in a graphics memory. Each tile includes at least two different types of data for each of a plurality of pixels. In one embodiment, the two different types of data comprise z data and stencil data.

Figure 2:
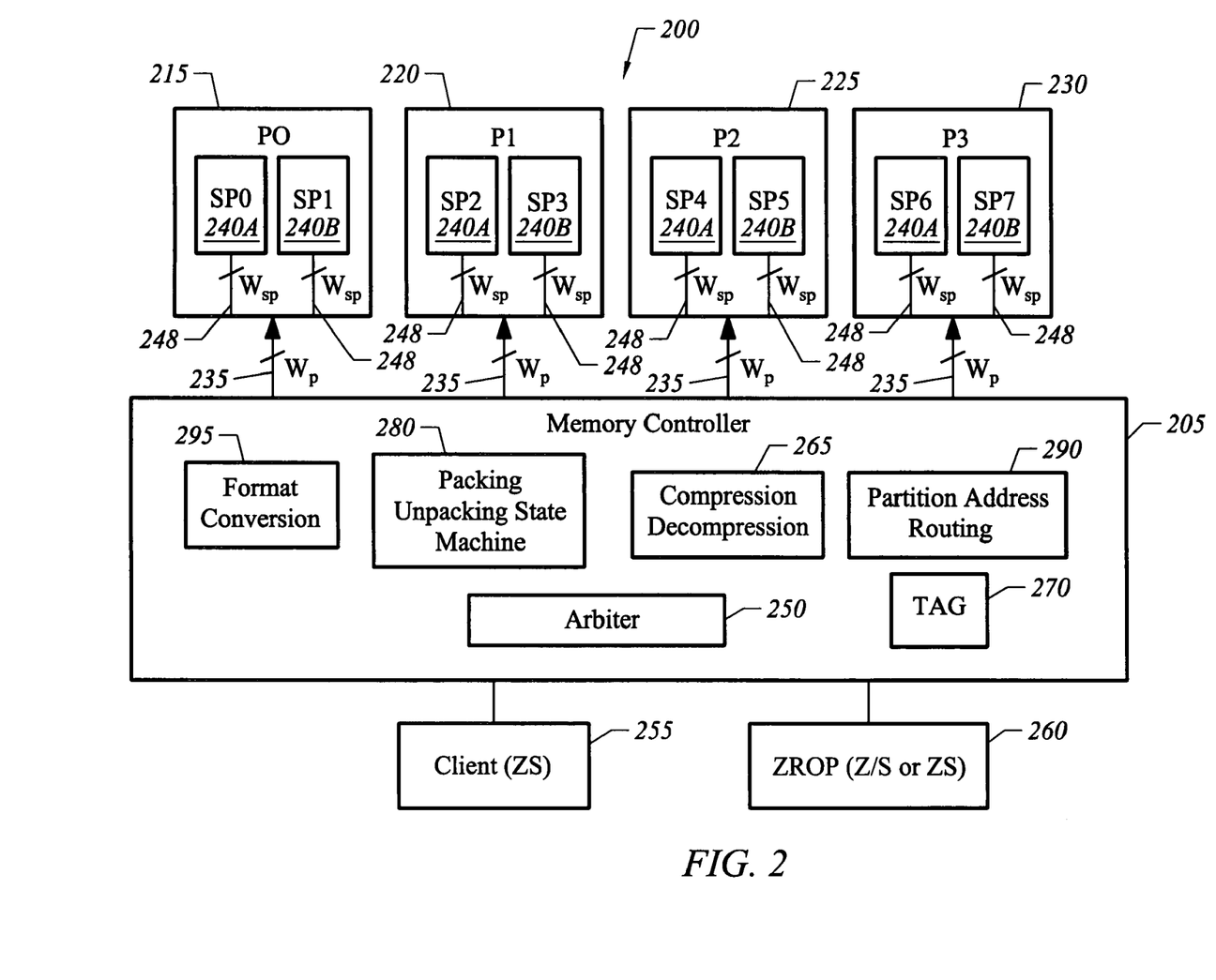
FIG. 2 is a block diagram of a tiled memory system in accordance with one embodiment of the present invention.

FIG. 2 is a block diagram illustrating a memory system 200 for organizing tile data in accordance with one embodiment of the present invention. In one embodiment, memory system 200 is a partitioned memory system, although it will be understood throughout the following discussion that embodiments of the present invention include a non-partitioned memory or a memory having a different arrangement of partitions than those illustrated in FIG. 2. Memory system 200 includes two or more memory partitions. Each partition P0 215, P1 220, P2 225, and P3 230 is coupled to a memory controller 205 by its own respective data bus 235. Data bus 235 has a memory byte width, $W_p$, with an associated packet width for addressing locations within the partition. In accord with a common usage in the graphics industry, a packet is a unit of data transfer.

In turn, each partition may have two or more sub-partitions, such as sub-partitions SP0 240A and SP1 240B. Each sub-partition 240A and 240B has its own respective sub-bus 248 with a corresponding byte width for sub-packets, $W_{sp}$, addressed to a memory location in the sub-partition. Thus, in a single memory access to a partition, Pi, a single memory access may be made to each of its sub-partition SPi. The sub-partitions are thus the minimum addressable unit of the graphics system. In one embodiment, each sub-partition is a double data rate (DDR) random access memory (RAM). As an illustrative example, each partition may have 64 data pins whereas each sub-partition 240A or 240B has 32 data pins. This permits, for example, a 64 bit partition to be implemented as two conventional 32 bit memory chips.

An individual tile represents tile data stored in memory locations of one of the partitions. The tile data stored in one partition is further distributed among the sub-partitions contained within the partition.

The memory controller 205 routes addresses of requests from individual clients of a graphics system to specific partition/sub-partition memory locations. The individual clients may be any component within a graphics processing system that requires access to a graphics memory to read, write, clear, or compress tile data, such as a z-raster operations (ZROP) module or a color raster operations (CROP) module.

In one embodiment, an arbitration module 250 selects a client. In one embodiment, the client is a portion of the graphics system expecting a standard data format in which two types of data for each pixel are stored in each data section of a tile, such as combined z, s data depth and stencil data. For example, in one embodiment a client (zs) 255 expects to receive combined z, s data for each pixel. Alternatively, as described below in more detail, a client 260 may be a portion of the graphics system that can be adapted to accept the two types of data as residing in separate portions of a tile, such as separate stencil and z data. In one embodiment, client 260 is a ZROP module and client 255 is a CROP module.

A partition address routing module 290 maps an address associated with a client (e.g., a read or write request) to a memory location in a partition and its associated sub-partitions. A compression/decompression module 265 is included to compress and decompress tile data to reduce memory bandwidth requirements. A tag module 270 may be included to identify, by a tag (e.g., one or more bits) attributes of the tiles, such as whether a tile holds data in a compressed format. A packing/unpacking state machine 280 and format conversion module 295 are provided to reorganize tile data. During a packet process, packing/unpacking state machine 280 and format conversion module 295 may be used to pack data in arrangements described below. The same modules preferably permit an unpacking procedure to be performed to reformat data into a format expected by a client. For example, for client 255, packing/unpacking state machine 280 and format conversion module 295 may generate combined z data and stencil data from separate z and stencil data stored in the tile. Thus, packing/unpacking state machine 280 and format conversion module 295 permit tile data to be arranged within a tile in more efficient ways while also providing clients access to tile data in a format expected by a client 255.

Figure 3:
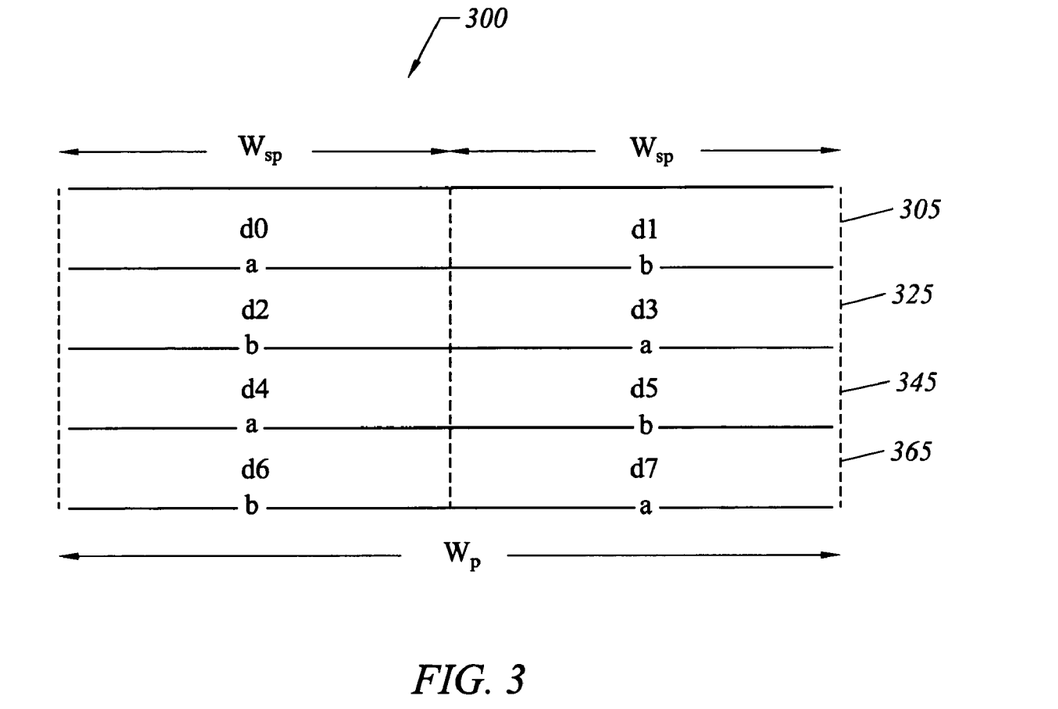
FIG. 3 illustrates a tile in accordance with one embodiment of the present invention.

FIG. 3 illustrates one embodiment of a tile 300 for storing two different types of pixel data, such as z data and stencil data. Tile 300 corresponds to a plurality of scan lines 305, 325, 345, and 365 arranged into data sections for storing tile data. In one embodiment, the tile has a total Byte width, Wp, corresponding to the data packet width of a memory partition. Tile 300 is divided into data sections d0, d1, d2, d3, d4, d5, d6, and d7 each having a byte width (which can also be described as a byte size), Wsp, corresponding to a data sub-packet width of a memory sub-partition. Thus, in the example illustrated, four memory accesses are sufficient to access all of the data sections of tile 300 for a read, write, clear, or compress operation.

Figure 4:
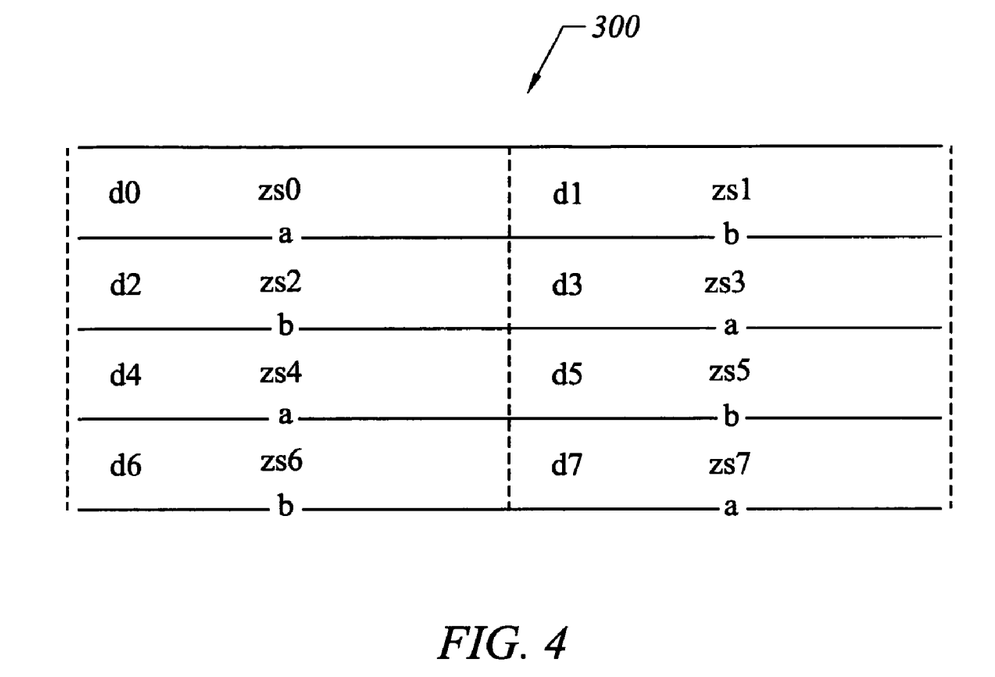
FIG. 4 illustrates a tile in accordance with one embodiment of the present invention.

Tile 300 may be used to store combined z, s data. FIG. 4 illustrates an embodiment of tile 300 in which each data section, $d_i$, of the tile stores combined z,s data, as represented by entries zsi stored in each data section di.

Each z and s illustrated in FIG. 4 may represent the z and stencil data for an individual pixel or a rectangle of pixels, depending upon the data requirements for z data and pixel data with respect to the sub-packet width. For example, with 24 bit z and 8 bit stencil, only 32 bits are needed to represent z, s data for one pixel. In one embodiment, tile 300 is a 32 byte by 4 scan line tile having a sub-packet width of 16 Bytes by 1 scan line corresponding to a single memory access of a 32 bit DDR RAM memory sub-partition. It is desirable that at least some of the pixels of an individual tile map onto the same DRAM page to improve memory coherence. For a partitioned memory in which each partition has two sub-partitions 240A and 240B, it is advantageous to assign each data section of the tile one of the two possible sub-partition types (i.e., either an a-type or a b-type). As illustrated in FIG. 4, in one embodiment each data section is further assigned as either an "a" data section or a "b" data section. In any single data access to a partition, an (a, b) pair of the tile may be addressed, which corresponds, in physical memory, to accessing one "a" sub-partition and one "b" sub-partition of the partition holding the tile data.

Figure 5:
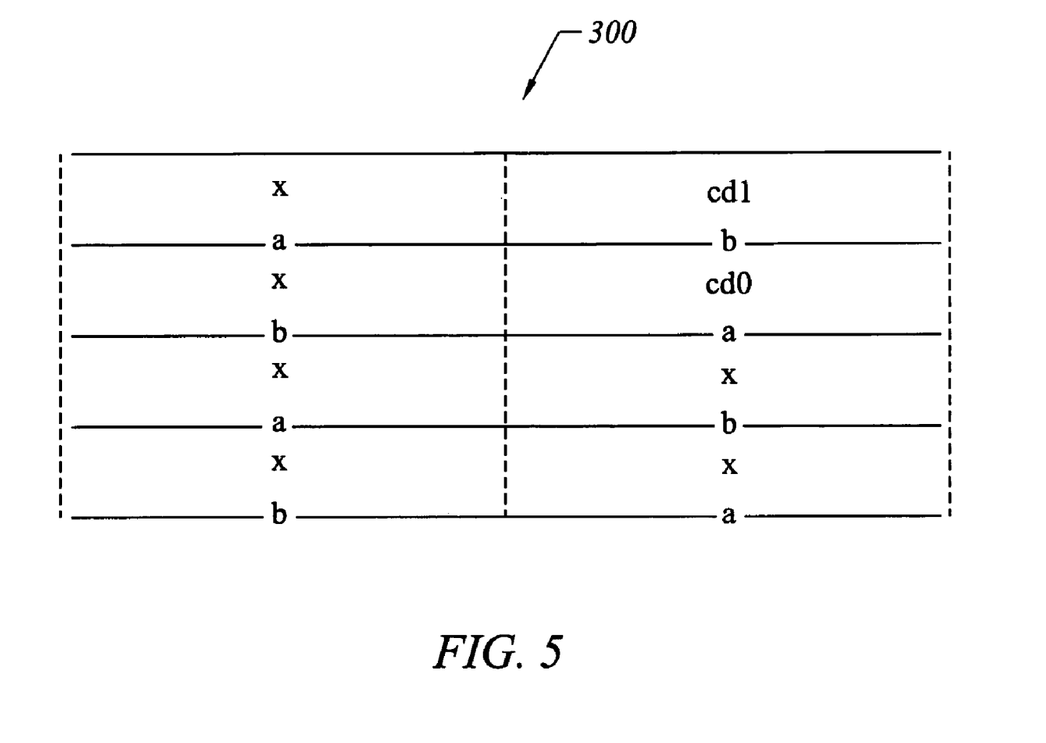
FIG. 5 illustrates a tile in accordance with one embodiment of the present invention.

As illustrated in FIG. 5, a compression algorithm may be used to compress the combined z data and stencil data. Using a 4:1 compression algorithm, this results in the data being compressed to compressed entries cd1, and cd0.

Figure 6:
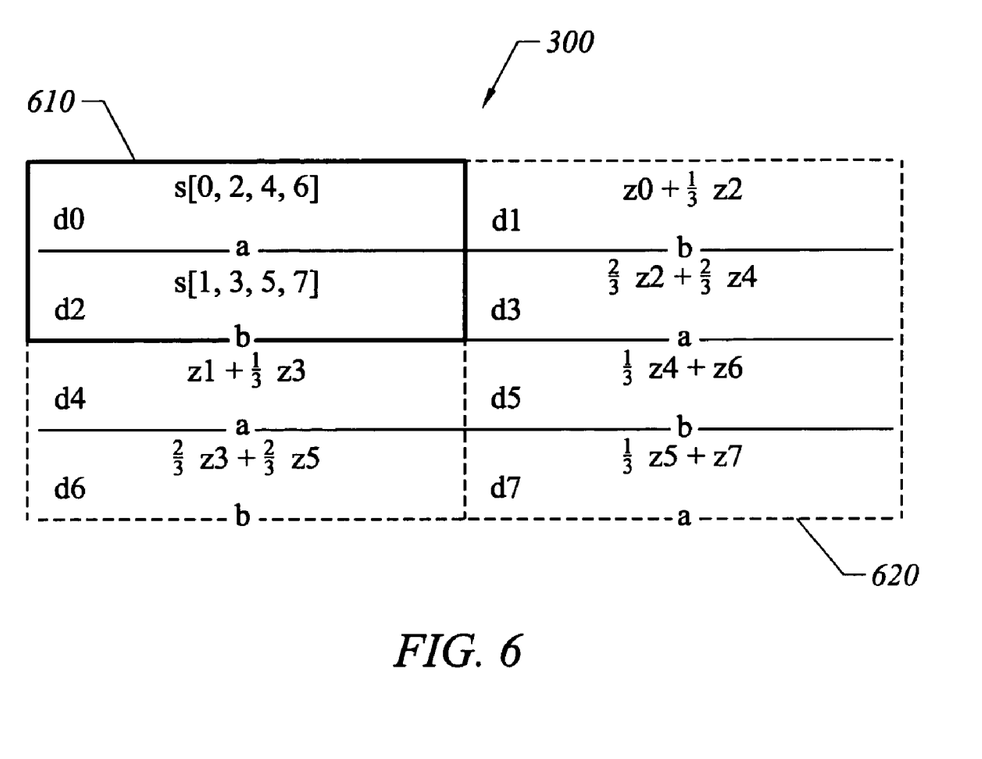
FIG. 6 illustrates a tile in accordance with one embodiment of the present invention.

FIG. 6 illustrates an embodiment in which z data and stencil data are packed into different data sections of tile 300. Stencil data is packed into a first portion 610 of the tile, comprising one or more data sections, such as sections d0 and d2. Z data is packed into a second portion 620 of the tile comprising the remaining data sections of the tile, such as sections d1, d3, d4, d5, d6, and d7. The stencil data in data sections d0 and d2 includes a plurality of stencil bytes, where S[i] is the stencil byte corresponding to a z byte, zi. The number of data sections required for stencil data will depend upon the byte width of each data portion and the number of bytes required for stencil data for each pixel.

In an exemplary embodiment, the z data is 24 bit z data and the stencil data is 8 bit stencil data. Thus combined z, s data that would normally fit into eight data sections may be repacked in the tile such that two of the data sections (e.g., data sections d0 and d2) are packed with stencil data and the remaining six data sections (e.g., data sections d1, d3, d4, d5, d6, and d7) are packed with z data.

The z data may be packed in the second portion 620 in a variety of ways. However, it is more efficient, in terms of memory accesses, to apportion the z data such that memory access to a partition (i.e., a single (a, b) pair lookup for a partition with two sub-partitions) is sufficient to access any single z value. Thus, in the example of FIG. 6, whenever z data is split across two data sections, the data is interleaved in an (a,b) pair of data sections. Thus, for example, z2 is split across the (a,b) pair of data sections d1 and d3. Similarly, stencil data is interleaved across an (a,b) pair of data sections.

In the embodiment illustrated in FIG. 6, each data section d1, d3, d4, d5, d6, and d7 in second portion 620 includes z data for two different zi's. One or more rules is applied to arrange the z data. In one embodiment, the z values are sorted by an index into the sub-packet. An individual z value may remain whole (e.g., z0, z1, z6, and z7) or be split across sub-packets (e.g., z2, z3, z4, and z5). In one embodiment, for z values split across sub-packets, the most significant bits are preferably in the sub-packet with the higher number.

The z data is also preferably packed to minimize the number of memory accesses required to access combinations of z data values and stencil values. Separating the stencil data into two a,b data sections permits all of the stencil data to be read in a single (a,b) pair lookup of a memory partition. Thus, for data operations that require only stencil data, efficiency is improved compared to storing combined z,s data, for which case four (a,b) pair lookups would be required to access all of the stencil data of the tile. An example of an application that benefits from storing stencil data separately from z data is a stencil-only rendering mode, which may occur during stencil creation for shadow volume rendering.

One benefit of storing z data separately in the tile is that it takes only three accesses, not four, to read or write all of the z data. Thus, in systems for which z data may be used independently of stencil data, a smaller number of data accesses are required compared with storing combined z and stencil data in each data section. Storing z data separately in the tile is also useful for a z-only rendering mode, corresponding to a z buffer creation phase, for which it is advantageous to access only z data.

Additionally, storing z data separately from stencil data is useful in modes of operation in which there is a read operation requiring one type of tile data and a write requiring the other type of data. For example, in one mode of z and stencil rendering there is reading but not writing of z data. In the same mode, there may be clearing of stencil data, which corresponds to writing, not reading stencil data. By separating z data and stencil data, one direction of input/output accesses is eliminated, reducing the total number of memory accesses that are required to read z data and write stencil data.

As previously described, in one embodiment z data is split across two (a,b) data sections such that a single a, b pair lookup may be used to access any individual z data value to perform a read, write, or clear operation. For example, referring to FIG. 6, z0 may be read by reading the d1 data section; z1 by reading the d4 data section; z2 may be read by reading the d1 and d3 data sections; z3 may be read by reading the d4 and d6 data sections; z4 may be read by reading the d5 and d7 data sections; z5 may be read by the d6 and d7 data sections; z6 may be read by reading the d5 data section; and z7 may be read by reading the d7 data section.

This arrangement of data permits a large number of pairs of z values to be accessed for a read, write, or clear operation in two (a,b) pair lookups, as summarized in Table 1. In two accesses, z2 and z3 may be read; z2 and z4 may be read; z3 and z5 may be read; zs0, zs1, zs4, and zs6 may be read; or zs1, zs3, zs5, and zs7 may be read. This corresponds to accessing four 4×2 pixel rectangles and two of the 8×2 pixel rectangles in one reference, where a 4×2 pixel rectangle is 4 wide pixels wide by 2 pixels high and an 8×2 pixel rectangle is 8 pixels wide by 2 pixels high.

TABLE 1

Table of Data sets available in One Or Two Memory Accesses

| Data Sets Accessible In One Access | Data Sets Accessible In Two Accesses |
|---|---|
| z0 and z1 | z2, z3 |
| z0 and z2 | z2, z4 |
| z1 and z3 | z3, z5 |
| z4 and z6 | z4, z5 |
| z5 and z7 | zs0, zs2, zs4, zs6 |
| z6 and z7 | zs1, zs3, zs5, zs7 |
| s[0, 2, 4, 6] and s[1, 3, 5, 7] | |

Figure 7:
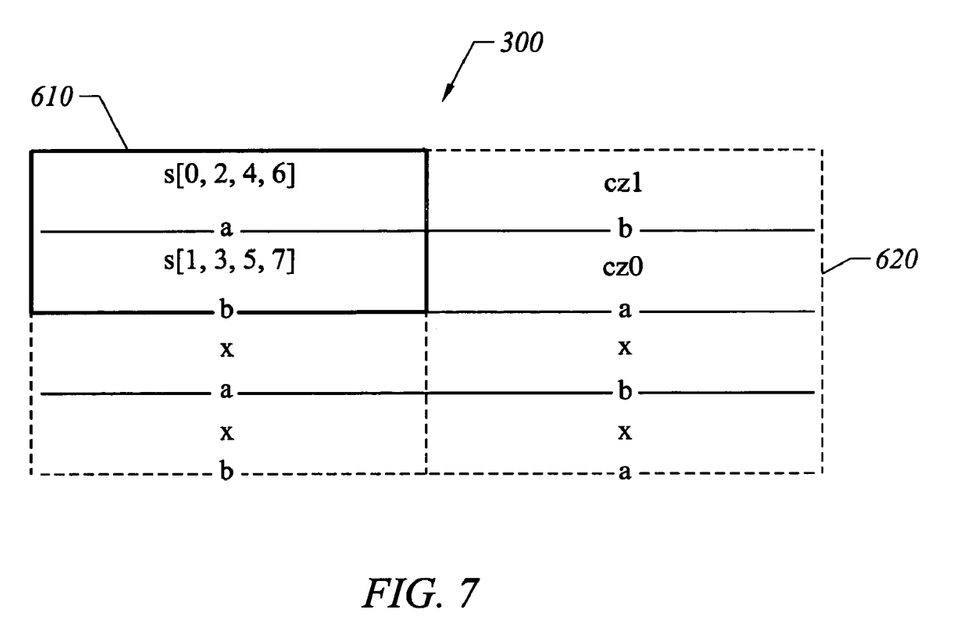
FIG. 7 illustrates a tile in accordance with one embodiment of the present invention.

Storing stencil data in separate sections of the tile than z data also provides benefits in regards to data compression. FIG. 7 illustrates a tile in which z data is compressed and stored in separate data sections of the tile using a 3:1 compression algorithm. This results in the compressed z data being held in two data sections of second portion 620 as compressed z data sections, cz0 and cz1. Stencil data is held in uncompressed form in first portion 610. This compression scheme provides several benefits. First, a reference to write stencil data does not require uncompressing z data, as would be required if the tile data sections held compressed combined z, s data. Thus, this arrangement of uncompressed stencil data and compressed z data is beneficial in applications that have a mode in which there are memory accesses for only stencil data. Second, in some applications, z data for a pixel is compressible whereas stencil data is incoherent with respect to the z data for the pixel. As a consequence, the compression success rate for lossless compression may be improved by compressing only the separate z data values.

A fetchmask may be used to fetch z or stencil values of interest. In one embodiment, an 8 bit fetchmask has a bit[i] corresponding to coverage of sub-packet i. In this embodiment, the ROP writes and the frame buffer returns 32 bit data using the following exemplary algorithm: 1) construct an ordered list of covered sub-packets from sub-partition a (0,3,4,7) and from sub-partition b (2,1, 6, 5); 2) place the lists side by side with the list (0, 3, 4, 7 occupying the least significant bits of any 256 bit data bus; 3) pack sub-packet pairs by going down the list, with the first sub-packet from the sub-partition a list being sub-packet 0 and the first sub-packet from the sub-partition b list being sub-packet 2; and 4) if there is no a or b match for an item in the list, leave that packet uncovered. The process is continued until all sub-packets have been sent.

One or more tile codes may be used to record the status of a tile. In one embodiment, the tile code is a binary number. For example, a tile code of 00 may be used to indicate no compression, stencil stored separately from z. A tile code of 01 may be used to indicate that z compression, stencil stored separately from z. Still another code, such as a tile code of 11, may be used to indicate that the tile stores data in a combined z, s format.

The permuting of data into the separate z and stencil format may be performed in a variety of ways. Combined z, s data from a graphics pipeline may be permuted during rendering, upon read, or upon writes to pack the data into separate portions of the tile. Alternatively, a graphics pipeline may be adapted to output pixel data in the separate z, s format.

While an embodiment of present invention has been described in detail in regards to tiles having z data and stencil data, more generally it will be understood that the present invention includes embodiments having other sets of tile data, such as separate alpha/color data.

It will also be understood that tile data may be arranged into a separate z, s format in graphics memory systems which are not sub-partitioned, such as a graphics memory having either no partitions or partitions but no sub-partitions. As an illustrative example, suppose a minimum memory access size is 32B for a non-partitioned memory. A 32 B×4 tile of combined z/stencil may be arranged into a 32B stencil data section in a first portion of the tile and 3 32B z data sections in a second portion of the tile.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method of storing data within a tile representing graphics data for a plurality of pixels, comprising:
for pixels associated with said tile, storing uncompressed stencil data into a first portion of said tile wherein each pixel has an individual stencil value; and
for pixels associated with said tile, storing compressed z data into a second portion of said tile such that said tile simultaneously stores uncompressed stencil data in said first portion and compressed z data in said second portion;
in a subsequent stencil-only rendering mode, performing a memory access to access only stencil data associated with said first portion such that the memory access does not require uncompressing z-data;
wherein said stencil data and said z data are stored in different portions of said tile that are independently addressable;
said first portion and said second portion each including at least one data section with at least two separate memory accesses required to access all of the data sections associated with said tile;
wherein the tile is stored in a partition of a partitioned graphics memory having a plurality of partitions and at least two sub-partitions per partition with each sub-partition being a minimum addressable unit, said partitioned graphics memory having a separate bus for accessing each partition and separate sub-buses for separately accessing each sub-partition within a particular partition such that in a single memory access to a selected partition each corresponding sub-partition is capable of being accessed in parallel, each data section having a byte size corresponding to a byte size for accessing one sub-partition via one of said sub-buses such that each data section of the tile is assigned to one of the sub-partitions of the partition assigned to store the tile.

2. The method of claim 1, further comprising: performing a memory access to access only compressed z data associated with said second portion.

3. The method of claim 1, further comprising: responsive to a request for z data, performing a memory access to access and decompress only z data.

4. The method of claim 1, further comprising: responsive to a request to write z data, performing a memory access to write and compress only z data.

5. The method of claim 1, further comprising:
in response to a request for combined z data and stencil data, separately accessing z data and stencil data; and
reformatting said z data and said stencil data to generate combined z data and stencil data for each pixel in said tile.

6. The method of claim 1 further comprising:
in response to a request to write combined z data and stencil data, reformatting said combined z data and said stencil data into separate z data and stencil data; and
writing said stencil data in said first portion of said tile and said z data in said second portion of said tile.

7. The method of claim 1, further comprising:
interleaving z data in data sections of said second portion so that a single memory access to said partition may be utilized to access any single z data value.

8. The method of claim 7, further comprising: interleaving stencil data into data sections of said first portion so that a single memory access to said partition may be utilized to access all of said stencil data.

9. The method of claim 1, wherein each sub-partition includes a random access memory.

10. The method of claim 1, further comprising using said stencil-only rendering mode for shadow volume rendering.

11. A method of storing data in a graphics system having at least one tile for storing z data and stencil data for a plurality of pixels, comprising:
storing uncompressed stencil data into a first portion of said tile that includes at least one data section wherein each pixel has an individual stencil value, each data section of said first portion having a byte size corresponding to a memory sub-partition transfer size; and
storing compressed z data into a second portion of said tile that includes at least one data section, each data section of said second portion also having a byte size corresponding to said memory sub-partition transfer size, thereby forming packed z data such that said tile simultaneously stores uncompressed stencil data in said first portion and compressed z data in said second portion;
wherein at least two separate memory accesses are required to access all of the data sections associated with said tile;
in a subsequent stencil-only rendering mode, performing a memory access to access only stencil data associated with said first portion such that the memory access does not require uncompressing z-data;
wherein the tile is stored in a partition of a partitioned graphics memory having a plurality of partitions and at least two sub-partitions per partition with each sub-partition being a minimum addressable unit, said partitioned graphics memory having a separate bus for accessing each partition and separate sub-buses for separately accessing each sub-partition within a particular partition such that in a single memory access to a selected partition each corresponding sub-partition is capable of being accessed in parallel, each data section having a byte size corresponding to a byte size for accessing one sub-partition via one of said sub-buses such that each data section of the tile is assigned to one of the sub-partitions of the partition assigned to store the tile.

12. The method of claim 11, further comprising:
unpacking said stencil data and said z data to form combined z data and stencil data in response to a request from a client for combined z, s data.

13. The method of claim 11, further comprising:
reading said stencil data and said z data; and
forming combined z data and stencil data for a client.

14. The method of claim 11, further comprising:
in a single memory transfer, accessing only z data in said second portion.

15. The method of claim 11, wherein a sub-partition includes a random access memory.

16. The method of claim 12, further comprising using said stencil-only rendering mode for shadow volume rendering.

17. A tiled graphics memory, comprising:

a partitioned graphics memory having a plurality of partitions and at least two sub-partitions per partition with each sub-partition being a minimum addressable unit, each partition having an associated bus with an associated first memory access byte size and separate sub-buses for separately accessing each sub-partition with each sub-bus having an associated second memory access byte size;

a memory configured to organize z data and stencil data for groups of pixels into tiles, said memory controller having a mode in which uncompressed stencil data for a group of pixels is packed into a first portion of a tile with each pixel having an individual stencil value and compressed z data for said group of pixels is packed into a second portion of said tile with said tile simultaneously storing uncompressed stencil data in said first portion and compressed z data in said second portion such that in a subsequent stencil-only rendering mode a memory access to access only stencil data associated with said first portion does not require uncompressing z-data;

said first portion and said second portion each including at least one data section with each data section having a byte size corresponding to a byte size for accessing one sub-partition via one of said sub-buses with at least two separate memory accesses required to access all of the data sections associated with said tile.

18. The tiled graphics memory of claim 17, wherein said memory controller includes an arbiter for determining a client to serve and said memory controller provides z data and stencil data in a format required by said client.

19. The tiled graphics memory of claim 17, wherein said first portion of said tile is comprised of data sections having said second byte size and said second portion of said tile is comprised of data sections having said second byte size.

20. The tiled graphics memory of claim 17, wherein each sub-partition a includes a random access memory.

21. The tile graphics memory of claim 17, wherein said stencil-only rendering mode is invoked for shadow volume rendering.

* * * * *